2,874,181

SALICYLIC ACID 2,6-DIMETHYL-4-n-PROPOXY-BENZOATE

Maxton F. Murray, Kalamazoo Township, Kalamazoo County, Mich., assignor to The Upjohn Company, Kalamazoo, Mich., a corporation of Michigan No Drawing. Application May 10, 1956
Serial No. 583,924

1 Claim. (Cl. 260—473)

The present invention is concerned with a physiologically active organic compound related to salicylic acid and is more particularly concerned with salicylic acid 2,6-dimethyl-4-n-propoxybenzoate, the strutural formula being as follows:

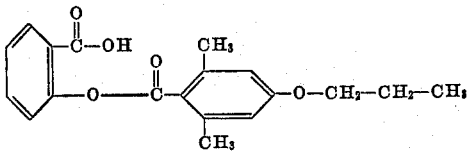

Aspirin or acetylsalicylic acid is known to be one of the best analgesics available; however, it is readily hydrolyzed and does not maintain its analgesic effect for any prolonged period of time. While many esters of salicylic acid have been made by esterifying the carboxylic acid group of salicylic acid with various alcohols, the esters obtained have either lacked adequate analgesic activity or the desired long-acting effect or both, or have been otherwise unsuitable, for example, because of a vile taste, for therapeutic use.

It has now been found that the disadvantages of the prior art are avoided by the aforesaid ester of salicylic acid and 2,6-dimethyl-4-n-propoxybenzoic acid, as may be obtained, for example, by esterifying salicylic acid with a 2,6-dimethyl-4-n-propoxybenzoyl halide or with 2,6-dimethyl-4-n-propoxybenzoic anhydride, and provides a physiologically active agent having high and prolonged analgesic and antipyretic effects. The compound of this invention, salicylic acid 2,6-dimethyl-4-n-propoxybenzoate gives a more prolonged action and causes less gastric distress than acetylsalicylic acid, is stable in pharmaceutical formulations, including aqueous formulations, and can be substituted for acetylsalicylic acid in pharmaceutical compositions such as tablets, capsules, elixirs, non-aqueous suspensions and in addition can be formulated in aqueous vehicles. The compound of this invention, due to its very low solubility and its high resistance to hydrolysis, especially at a pH of 2-4, is particularly suitable for use in aqueous suspensions for administration to children and others who have difficulties in taking tablets. Other uses and advantages of the present invention will be apparent to one skilled in the art.

The salicylic acid 2,6-dimethyl-4-n-propoxybenzoate of the present invention is obtained by esterification of salicylic acid to introduce the 2,6-dimethyl-4-n-propoxybenzoyl radical, as more fully illustrated by the example below. The esterification advantageously is carried out with 2,6-dimethyl-4-n-propoxybenzoyl chloride or bromide in the presence of an acid-binding agent, such as a tertiary amine, e. g. pyridine, dimethylaniline, collidine, triethylamine, etc. The esterification alternatively can be carried out with 2,6-dimethyl-4-n-propoxybenzoic anhydride; no acid-binding agent will be necessary with this reagent. Other esterification methods, such as transesterification, can also be used. Equimolar quantities of the reactants and of the acid-binding agent are preferred; however, an excess of one reactant or of the acid-binding agent can be used if desired. The reaction is advantageously carried out under substantially anhydrous conditions and in the presence of an inert medium or solvent such as diethyl ether, diisopropyl ether, methylene chloride, chloroform, ethylene dichloride and dioxane. While the optimum reaction temperature is about zero to about thirty degrees centigrade when anhydrous diethyl ether is used as solvent, any lower reactive temperature can be used. Also higher temperatures of up to about 75 degrees centigrade can be used, particularly when other solvents are employed. Ordinarily, the maximum temperature is governed by the boiling point of the solvent at atmospheric pressure, but a higher maximum for a given solvent can be obtained, if desired, by the use of superatmospheric pressure. The preferred reaction temperature is about zero to about fifty degrees centigrade.

The following example is illustrative only and is not to be construed as limiting the scope of the present invention.

EXAMPLE

*Salicylic acid 2,6-dimethyl-4-n-propoxybenzoate*

To a solution of 27.6 grams (0.020 mole) of salicylic acid and 45.2 grams (0.20 mole) of 2,6-dimethyl-4-n-propoxybenzoyl chloride [U. S. 2,719,851, Preparation 20] in 800 milliliters of anhydrous diethyl ether, cooled to ten degrees centigrade, was added 15.82 grams (0.20 mole) of pyridine, with good stirring, over a period of ten minutes while holding the temperature of the reaction mixture at about ten degrees centigrade. The cooling bath was then removed, the mixture stirred for eight hours, and then allowed to stand overnight. The reaction mixture was washed three times with 200-milliliter portions of water; the organic layer was dried over anhydrous sodium sulfate, and concentrated to approximately 600 milliliters. After refrigerating the organic layer overnight at minus five degrees centigrade, a solid product separated from this layer. The solid product was isolated by filtration, washed with cold diethyl ether, and dried at 55 degrees centigrade in vacuo to yield 20.7 grams (31.6 percent) of salicylic acid 2,6-dimethyl-4-n-propoxybenzoate melting at 129-130 degrees centigrade.

A second crop of 16.6 grams (25.4 percent), melting at 129-130 degrees centigrade, was obtained by concentrating the filtrate.

An analytical sample, prepared by recrystallization from diethyl ether, melted at 130-131 degrees centigrade.

*Analysis.*—Calculated for $C_{19}H_{20}O_5$: C, 69.50; H, 6.14. Found: C, 69.20; H, 6.49.

Having thus described my invention and the best manner known to me for carrying it out, it is to be understood that the invention is not limited in any of the particular details set forth and described, as obvious modifications and equivalents will be apparent to one skilled in the art, and the invention is therefore to be limited only by the scope of the appended claim.

I claim:

Salicylic acid 2,6-dimethyl-4-n-propoxybenzoate.

References Cited in the file of this patent

Wheland: "The Theory of Resonance," pp. 131, 136 to 138, J. Wiley, 1944.

Remick: "Electronic Interpretations of Organic Chemistry," pp. 411, 413 to 418, J. Wiley (1949).

Goering et al.: J. Am. Chem. Soc. 76, 787 to 791 (1954).

Rabjohn et al.: J. Org. Chem. 20, 271-3 (1955).

Roberts et al.: ibid., 939 to 940.